United States Patent [19]

Haas et al.

[11] Patent Number: 5,391,845
[45] Date of Patent: Feb. 21, 1995

[54] INERTIA SENSOR

[75] Inventors: Lothar Haas, Rosstal; Hans-Joerg Schmidt, Dietenhofen, both of Germany

[73] Assignee: Robert Bosch GmbH, Stuttgart, Germany

[21] Appl. No.: 104,031

[22] PCT Filed: Mar. 3, 1993

[86] PCT No.: PCT/DE93/00186

§ 371 Date: Aug. 6, 1993

§ 102(e) Date: Aug. 6, 1993

[87] PCT Pub. No.: WO93/19377

PCT Pub. Date: Sep. 30, 1993

[30] Foreign Application Priority Data

Mar. 21, 1992 [DE] Germany .............. 4209272

[51] Int. Cl.⁶ .................. H01H 35/14; G01P 15/08
[52] U.S. Cl. .................. 200/61.45 R; 200/61.52; 200/61.45 M; 335/205; 338/32 H
[58] Field of Search ............ 200/61.45 R, 61.53, 200/61.45 M; 335/205-207; 73/517 R; 338/32 H; 340/666; G01P 15/02, 15/08; G01R 33/06; B60R 21/32, 22/40; H01H 35/02, 35/14

[56] References Cited

U.S. PATENT DOCUMENTS

| | | | |
|---|---|---|---|
| 3,601,729 | 8/1971 | Hierta | 335/205 |
| 3,788,149 | 1/1974 | Wilner | 73/517 R |
| 4,060,004 | 11/1977 | Scholz et al. | 200/61.45 R X |
| 4,103,842 | 8/1978 | Martin et al. | 200/61.52 X |
| 4,191,951 | 3/1980 | Fuzzell | 200/84 C X |
| 4,255,629 | 3/1981 | Bell | 200/61.45 R |
| 4,377,088 | 3/1983 | Evert | 324/208 X |
| 4,900,925 | 2/1990 | Andres et al. | 73/517 R X |
| 4,982,684 | 1/1991 | Rubey | 200/61.45 M X |
| 5,013,909 | 5/1991 | Sondergeld et al. | 73/517 R X |
| 5,283,402 | 2/1994 | Green | 200/61.45 R |

FOREIGN PATENT DOCUMENTS

| | | |
|---|---|---|
| 0345722 | 12/1989 | European Pat. Off. . |
| 3540947 | 5/1987 | Germany . |
| 4036224 | 5/1992 | Germany . |

*Primary Examiner*—J. R. Scott
*Attorney, Agent, or Firm*—Michael J. Striker

[57] ABSTRACT

A sensor for automatically triggering safety devices in motor vehicles, the sensor has a housing having a housing recess with a base and a tilting body located in the housing recess, the tilting body serving as a seismic mass and triggering a control signal when a predetermined threshold value is exceeded, the tilting body having an edge and a base. The base of the housing recess is provided with knobs at least in the region of the edge of the tilting body. The base of the tilting body is flat at least in the region of the knobs.

8 Claims, 2 Drawing Sheets

INERTIA SENSOR

BACKGROUND OF THE INVENTION

The present invention relates to a sensor for automatic triggering of safety devices in motor vehicles.

It particular, it relates to such a sensor which has a housing with a housing recess accommodating a tilting body which serves as a seismic mass and triggers a control signal when a predetermined threshold value is exceeded. Such a sensor is known e.g. from the later publication DE-OS 40 36 224.8. In this sensor a tilting body is arranged as seismic mass in the base of a housing recess. When force or acceleration is applied, the tilting body tilts over and in so doing triggers a measurement signal in a triggering device. The base of the housing recess of the sensor as well as the support surface of the tilting body on the base are constructed so as to be flat. Penetrating moisture and a corresponding poor choice of materials for the housing and tilting body can cause the tilting body to adhere to the base. The tilting angle can accordingly be shifted in extreme cases by as much as 5 degrees and will trigger only after a delay. The operative adhesive forces between the two surfaces act as a threshold value which cannot be influenced and which prevents an accurate and reliable triggering of the sensor.

SUMMARY OF THE INVENTION

Accordingly, it is an object of the present invention to provide a sensor for automatic triggering of safety devices in motor vehicles, which avoids the disadvantages of the prior art.

In keeping with these objects and with others which will become apparent hereinafter, one feature of the present invention resides, briefly stated, in a sensor having a housing with a housing recess accommodating a tilting body serving as seismic mass wherein a base of the housing recess is provided knobs at least in the region of an edge of the tilting body, and the tilting body has a base which is flat at least in the region of the knobs.

When the sensor is designed in accordance with the present invention, it has the advantage over the prior art Of a simple and robust construction. The frictional and adhesive forces are very low. Even if moisture should penetrate, no adhesive effect can take place or, if so, one which is so slight that it could not negatively influence the triggering time. Due to the lateral channels in the housing wall, dirt particles and abraded particles can fall onto the base. If the base is constructed in the shape of a funnel, these dirt particles can collect in the funnel and will not negatively influence the triggering capability of the tilting body. In particular, the sensor is free from dirt particles in the tilting area of the tilting body so as to enable a flawless tilting function. The particles located in the tilting area are forced into the funnel by the constant motion of the tilting body in that the tilting body tilts back and forth during slight accelerations not yet resulting in a triggering of the safety devices. Because of the special shape of the knobs arranged in the base, the tilting cylinder can roll on the knobs with very slight friction losses.

In accordance with further features of the present invention the knobs can have a convex shape and be arranged at regular intervals, and they also can be formed as spherically shaped members.

The base can be formed as a funnel and the knobs can be located at the edge of the opening of the funnel.

The housing recess can have a region which narrows conically toward the base, and the channels can be provided in the region which extends toward the base. The channels can have V-shaped grooves.

Finally, the tilting body can be arranged so that its longitudinal axis extends perpendicularly to the applied force.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
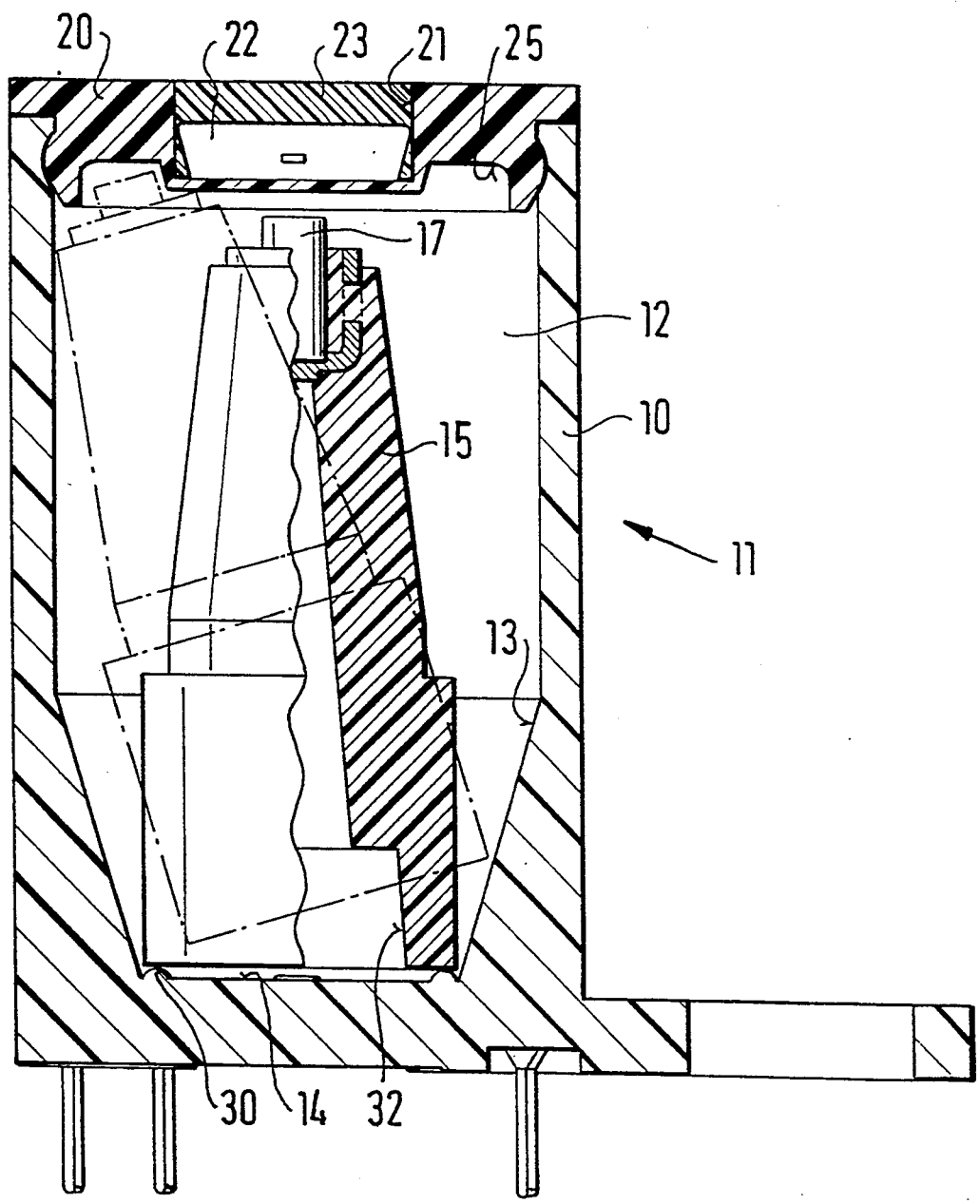
FIG. 1 shows a longitudinal section through a sensor with inserted tilting body which is shown in the so-called overhead position in dashed lines.

In FIG. 1, the roughly cup-shaped housing of a sensor 11 is designated by 10, its interior having a region 12 of constant diameter as viewed from the opening and an adjoining conically extending region 13 which narrows toward the base 14. The angle of inclination $\alpha$ of the conical region 13 conforms to the maximum allowable hysteresis of the tilting angle. Further, the angle $\alpha$ is determined by the diameter of a tilting body in region 13 of the housing 10. The tilting body 15 rests on the base 14 and serves as a seismic mass. Ideally, the edges of the tilting body facing the base 13 are sharp-edged. A permanent magnet 17 is inserted in the body 15 on the end side located opposite the base 14. The polarizing direction of the permanent magnet 17 is oriented in the axial direction of the tilting body 15. The permanent magnet 17 also projects somewhat beyond the end face of the tilting body 15.

The interior of the housing 10 is closed by a cover 20. A Hall switch 22 is arranged in a recess 21 of the cover 20 diametrically opposite the permanent magnet 17. This recess 21 is closed by a sealing compound 23 which protects the Hall switch 22 from environmental influences. The Hall switch 22 is connected in a manner not shown in detail with a plug connector, not shown, and a triggering device via a connecting line. Further, an annular groove 25 is constructed in the cover 20 on the side facing the tilting body 15. This annular groove 25 serves as securing means so that when the tilting body 15 is in the so-called overhead position, i.e. when the sensor 11 stands on its head, the tilting body 15 can slide into the annular groove 25 with its magnet 17, which simultaneously serves as an extension, and can no longer return to the initial position.

A reed contact, for example, can also be used instead of the above-mentioned triggering device assisted by a permanent magnet and Hall switch, or a triggering signal can be generated with the aid of optical devices, e.g. by a reference light-barrier. If a reference light-barrier were used, an optical transmitter and an optical receiver, for example, would be arranged in proximity to one another in the cover of the sensor. Instead of a permanent magnet, a light-reflecting surface or a nonreflective surface, depending on the measurement method, would be located on the end face of the tilting body.

Figure 3:
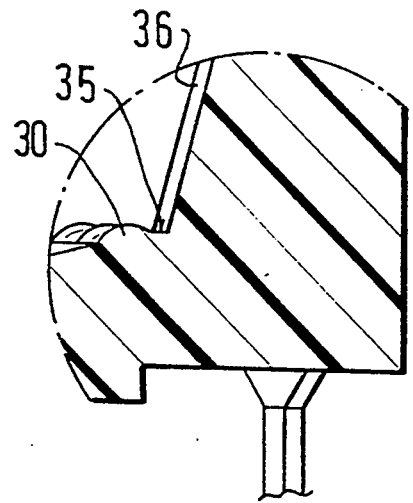
FIG. 3 shows a detail.

According to the invention, knobs 30 are constructed at the base 14 of the housing 10. The end side of the tilting body 15 which is flat at least in this region rests on these knobs 30. The knobs 30 are located, if possible, at the base in the region of the edge of the tilting body 15. The knobs 30 are to reduce the support surface of the tilting body 15 on the base 14 so that the ideal aim would be a punctiform contact. Further, the knobs must be high enough so that moisture penetrating between the base 15 and the end side, i.e. the support surface of the tilting body, cannot exert any adhesive effect between the two surfaces. The knobs 30 accordingly have a concave shape or are constructed as spherical cap-shaped members as shown in an enlarged view in FIG. 3. The radius of the spherical cap is so configured that the tilting body 15 can roll easily. The diameter of the spherical cap should not exceed half the spherical diameter, otherwise the tilting body would not roll on the spherical cap, but would slip off and so cause further friction losses. A slight adhesive behavior between the base 14 or knobs 30 and the tilting body 15 can be influenced by an appropriate choice of materials. For example, polyacetal (POM) is a suitable material for the tilting body 15 and polybutyleneterephthalate (PBT) is a suitable material for the base and knobs 30. The knobs 30 can be injection molded on the base additionally or may already be formed along with the housing during the injection molding process. The arrangement of the knobs 30 depends on the shape of the tilting body 15. If the tilting body 15 is constructed as a cylinder as shown in FIG. 1, the knobs are arranged on a circular path at equal intervals. Cylindrical tilting bodies have the advantage that accelerations or forces acting from all directions can tilt the tilting body 15 and can accordingly trigger a measurement signal. This is known as an omnidirectional sensor. The center of gravity of the tilting body and accordingly the triggering threshold can be influenced by the pocket bore hole 32 which is incorporated in the tilting body 15 proceeding from the base. On the other hand, if the tilting body has a square or rectangular end face it triggers only in certain acceleration directions or favors a very specific triggering direction caused by its shape. This shape also determines the arrangement of the knobs on the base so that the knobs are arranged in such cases on the circumferential line of a square or rectangle. However, the shape of the knobs and their rolling geometry are not influenced by the shape of the tilting body itself.

Figure 2:
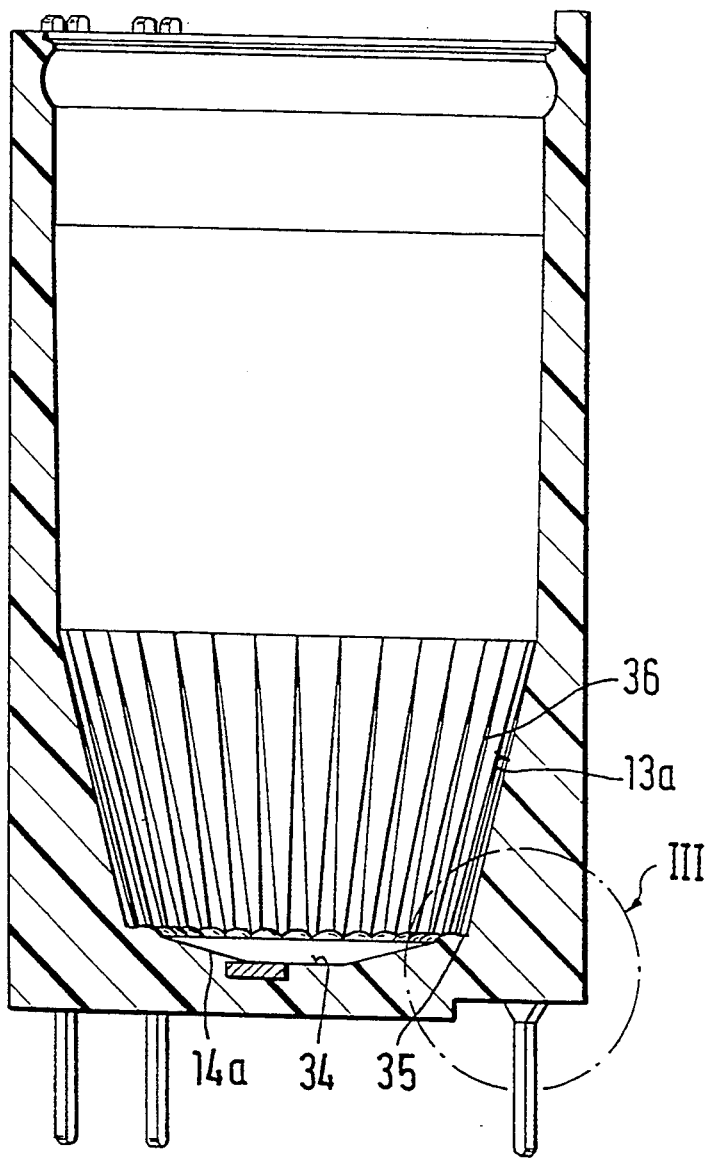
FIG. 2 shows a modification of the housing.

In the modification of the embodiment example according to FIG. 2, a funnel 34 is constructed in the base 14a. The knobs 30 are arranged at the edge of the opening 35 of the funnel 34; however, they are constructed as described in FIG. 1.

In the conical region 13a of the housing recess are channels 36 which extend as far as the starting point of the knobs 30. The Shape of the channels 36 can vary. For example, longitudinal grooves or V-shaped grooves can be used which increase in magnitude continuously toward the base 14a. The purpose of the channels 36 is to allow dirt particles or drops of liquid to slide or creep toward the funnel 34 so as not to impair the tilting function. They are accordingly at a distance from the actual tilting area of the tilting body 15. Since the knobs 30 are at a distance from one another, the dirt particles can creep into the funnel 34.

Since the tilting body tilts even as a result of a slight acceleration, the particles located in the tilting area are forced toward the center of the cylinder 34 by the constant motion of the tilting body 15.

The manner of operation of the sensor 11 is sufficiently known and therefore is discussed here only briefly. When an acceleration acts on the sensor 11 or if the sensor 11 is tilted at an angle, the tilting body 15 likewise tilts. The permanent magnet 17 is accordingly moved out of its initial position relative to the Hall switch 22 so that the magnetic field of the permanent magnet 17 is shifted as well. In the tilted state, the flux lines no longer penetrate the Hall switch 22 in the region of the end side of the permanent magnet 17. Accordingly, a switching pulse is triggered which is further processed with electronic devices which are not shown here in more detail. The sensor can not only be used for determining vehicle inclinations and/or tilting movements, but also for detecting acceleration processes which are not connected with a shifting of the housing 10. Connected safety devices, such as engagement of the roll bar, air bag, belt tightener, etc., can be triggered by the generated measurement signals.

It will be understood that each of the elements described above, or two or more together, may also find a useful application in other types of constructions differing from the types described above.

While the invention has been illustrated and described as embodied in a sensor, particularly for automatic triggering of safety devices in motor vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A sensor for automatically triggering safety devices in motor vehicles, the sensor comprising a housing having a housing recess with a base; a tilting body tiltably located in said housing recess and serving as a seismic mass, said tilting body having an end side facing said base of said housing recess; sensing means for sensing a tilting of said tilting body and triggering a control signal when the tilting exceeds a threshold value, said base of said housing recess of said housing being provided with a plurality of knobs, said end side of said tilting body being flat at least in the region of said knobs so as to provide a contact between said flat end side of said tilting body and said knobs of said housing recess of said base.

2. A sensor as defined in claim 1, wherein said end side of said tilting body has an edge, said knobs of said housing recess of said housing being located at least in the region of said edge of said end side of said tilting body.

3. A sensor as defined in claim 1, wherein said knobs have a convex shape and are arranged at regular intervals from one another.

4. A sensor as defined in claim 1, wherein said knobs are formed as spherically shaped members.

5. A sensor as defined in claim 1, wherein said base of said housing recess is formed as a funnel having an opening with an edge, said knobs being located at said edge of said opening of said funnel.

6. A sensor as defined in claim 1, wherein said housing has a region which narrows conically toward said base of said housing recess, said housing also having channels which are formed in a region which extends toward said base of said housing recess.

7. A sensor as defined in claim 6, wherein said channels are formed as V-shaped grooves.

8. A sensor as defined in claim 1, wherein said tilting body has a longitudinal axis which extends perpendicularly to a force applied to said tilting body.

* * * * *